United States Patent
Bostick et al.

(10) Patent No.: US 10,367,933 B2
(45) Date of Patent: Jul. 30, 2019

(54) CONTEXT AND ENVIRONMENT AWARE VOLUME CONTROL IN TELEPHONIC CONVERSATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/256,738

(22) Filed: Jan. 24, 2019

(65) Prior Publication Data
US 2019/0173995 A1    Jun. 6, 2019

Related U.S. Application Data (63) Continuation of application No. 15/812,351, filed on Nov. 14, 2017, now Pat. No. 10,230,831, which is a
(Continued)

(51) Int. Cl.
*H04M 1/725* (2006.01)
*H04M 15/00* (2006.01)
(Continued)

(52) U.S. Cl.
CPC .... *H04M 1/72569* (2013.01); *G06K 9/00315* (2013.01); *G10L 15/1815* (2013.01);
(Continued)

(58) Field of Classification Search
CPC ............ H04M 1/72569; H04M 15/47; H04M 3/42348; H04M 15/8033; H04M 15/58;
(Continued)

(56) References Cited

U.S. PATENT DOCUMENTS 5,467,393 A    11/1995 Rasmusson
6,834,107 B1*  12/2004 Hurst .................. H04M 1/6016
                                                 379/373.01
(Continued)

FOREIGN PATENT DOCUMENTS

| CN | 101207879 A | 6/2008 |
|---|---|---|
| EP | 2267695 A2 | 12/2010 |
| EP | 2760016 A2 | 7/2014 |

OTHER PUBLICATIONS

List of IBM Patents or Patent Applications Treated as Related dated Jan. 24, 2019, 1 page.
(Continued)

*Primary Examiner* — Marcos L Torres
(74) *Attorney, Agent, or Firm* — Brian Restauro; Andrew D. Wright; Roberts Mlotkowski Safran Cole & Calderon, P.C.

(57) ABSTRACT

Systems and methods for automatically adjusting telephonic conversation volume are provided. A computer-implemented method includes: detecting a telephone being used for a conversation and receiving data from at least one of a microphone, a camera, and a location system associated with the telephone. The method includes analyzing the data to determine at least one of: usage of sensitive or confidential words in the conversation; distance of the telephone to another person; level of annoyance of another person; conversation loudness relative to ambient loudness; location of the telephone relative to quiet areas. The method includes
(Continued)

automatically adjusting a volume of a speaker of the telephone during the conversation based on the analyzing.

14 Claims, 5 Drawing Sheets

Related U.S. Application Data continuation of application No. 15/398,001, filed on Jan. 4, 2017, now Pat. No. 9,870,782, which is a continuation of application No. 14/940,493, filed on Nov. 13, 2015, now Pat. No. 9,571,628.

(51) Int. Cl.
*G06K 9/00* (2006.01)
*G10L 15/18* (2013.01)
*G10L 21/034* (2013.01)
*H04M 1/60* (2006.01)
*H04W 4/021* (2018.01)
*H04W 4/50* (2018.01)
*H04M 3/42* (2006.01)
*G06F 3/16* (2006.01)

(52) U.S. Cl.
CPC ......... *G10L 21/034* (2013.01); *H04M 1/6033* (2013.01); *H04M 3/42348* (2013.01); *H04M 15/47* (2013.01); *H04M 15/58* (2013.01); *H04M 15/8033* (2013.01); *H04W 4/021* (2013.01); *H04W 4/50* (2018.02); *G06F 3/165* (2013.01); *H04M 1/72572* (2013.01); *H04M 15/60* (2013.01); *H04M 2250/52* (2013.01)

(58) Field of Classification Search
CPC ............... H04M 1/6033; H04M 15/60; H04M 1/72572; H04M 2250/52; H04W 4/50; H04W 4/021; G06K 9/00315; G10L 21/034; G10L 15/1815; G06F 3/165
See application file for complete search history.

(56) References Cited

U.S. PATENT DOCUMENTS

| 7,062,073 | B1 | 6/2006 | Tumey et al. |
| 7,968,786 | B2 | 6/2011 | Kemmochi et al. |
| 8,155,277 | B2 | 4/2012 | Sifuentes |
| 9,077,814 | B2 | 7/2015 | Lee |
| 9,571,628 | B1 | 2/2017 | Bostick et al. |
| 9,870,782 | B2 | 1/2018 | Bostick et al. |
| 2008/0113657 | A1 | 5/2008 | Abu-Amara et al. |
| 2014/0045547 | A1 | 2/2014 | Singamsetty et al. |
| 2014/0122077 | A1* | 5/2014 | Nishikawa .............. G10L 17/04 704/249 |
| 2014/0241540 | A1 | 8/2014 | Hodges et al. |
| 2015/0011195 | A1 | 1/2015 | Li |
| 2017/0140773 | A1 | 5/2017 | Bostick et al. |
| 2018/0068673 | A1 | 3/2018 | Bostick et al. |

OTHER PUBLICATIONS

Kanjo, "NoiseSPY: A Real-Time Mobile Phone Platform for Urban Noise Monitoring and Mapping", Springer Science + Business Media, LLC, Online, Nov. 20, 2009, 13 pages.

Sawhney, "Contextual Awareness, Messaging and Communication in Nomadic Audio Environments", Massachusetts Institute of Technology, Jun. 1998, 122 pages.

Siewiorek et al., "SenSay: A Context-Aware Mobile Phone", Human Computer Interaction Institute and Institute for Complex Engineered Systems Carnegie Mellon University, http://www.cs.cmu.edu/~aura/docdir/sensay_iswc.pdf, Date Accessed: Aug. 31, 2015,10 Pages.

Bonin et al., "A Context-Aware NLP Approach For Noteworthiness Detection in Cellphone Conversations", International Conference on Computational Linguistics: Technical Papers, 25th Edition, Dublin, Ireland, Aug. 23-29, 2014, 12 pages.

Ljungstrand, "Context Awareness and Mobile Phones", Personal and Ubiquitous Computing, Springer-Verlag London Ltd., 2001, 4 pages.

Anonymous,"Automatic Volume Control", http://www.starmarktechnologies.com/Automatic-Volume-Control/index.html, Date Accessed: Aug. 28, 2015, 2 pages.

Campbell, "Apple patent automatically adjusts iPhone speaker volume based on proximity", http://appleinsider.com/articles/13/05/28/apple-patent-automatically-adjusts-iphone-speaker-volume-based-on-proximity, May 28, 2013, 3 pages.

Kulkarni et al., "Facial Expression (Mood) Recognition from Facial Images Using Committee Neural Networks", BioMedical Engineering OnLine, Aug. 29, 2009; 12 Pages.

Agrawal et al., "Mood Detection: Implementing a Facial Expression Recognition System", cs229.stanford.edu/proj2009/AgrawalCosgriffMudur.pdf; Accessed Nov. 13, 2015; 5 Pages.

* cited by examiner

CONTEXT AND ENVIRONMENT AWARE VOLUME CONTROL IN TELEPHONIC CONVERSATION

BACKGROUND

The present invention relates generally to telephone devices and, more particularly, to automatic volume control in telephone devices.

Telephone usage has become nearly ubiquitous in modern life. A problem with telephone usage in crowded spaces is that often a telephone conversation by one person can be heard by other people in the vicinity. People often set the volume to a high level on their telephone device with the result that other people in the vicinity of the telephone can hear one or both sides of the conversation. This can be annoying to the people that are subjected to someone else's conversation. It can also be embarrassing and/or damaging to the person conducting the conversation, for example, when sensitive or confidential subject matter is unintentionally revealed to other people in the vicinity.

SUMMARY

In an aspect of the invention, a computer implemented method includes detecting a telephone being used for a conversation and receiving data from at least one of a microphone, a camera, and a location system associated with the telephone. The method includes analyzing the data to determine at least one of: usage of sensitive or confidential words in the conversation; distance of the telephone to another person; level of annoyance of another person; conversation loudness relative to ambient loudness; location of the telephone relative to quiet areas. The method includes automatically adjusting a volume of a speaker of the telephone during the conversation based on the analyzing.

In another aspect of the invention, there is a system for automatically adjusting telephonic conversation volume. The system includes: a telephone comprising a processor running a volume control module; at least one microphone configured to provide microphone data to the volume control module; at least one camera configured to provide camera data to the volume control module; and a location system configured to provide location data to the volume control module. The volume control module is configured to automatically reduce a volume of a speaker of the telephone during a conversation based on analyzing at least one of the microphone data, the camera data, and the location data.

In another aspect of the invention, there is a computer program product for automatically adjusting telephonic conversation volume. The computer program product includes a computer readable storage medium having program instructions embodied therewith. The program instructions are executable by a computing device to cause the computing device to: detect a telephone being used for a conversation; obtain microphone data, camera data, and location data associated with the telephone; determine, using the microphone data, whether sensitive or confidential words are used in the conversation using natural language processing; determine, using the microphone data, whether conversation loudness exceeds ambient loudness by a predefined amount; determine, using the camera data, whether another person is within a predefined distance of the telephone; determine, using the camera data, a level of annoyance of another person; determine, using the location data, whether a location of the telephone coincides with a predefined quiet area; and automatically adjust a volume of a speaker of the telephone based on at least one of the microphone data, the camera data, and the location data.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to telephone devices and, more particularly, to automatic volume control in telephone devices. According to aspects of the invention, speaker volume on a device such as a phone is automatically adjusted based on a number of factors such as location, ambient sound levels, proximity to other people, detected level of annoyance of other people, and detected sensitive and/or confidential subject matter in the conversation. The factors may be determined based on data collected from sensors including at least one of: an audio capturing device (e.g., a microphone) that detects loudness of the telephone conversation; at least one camera that detects a person in the vicinity of the telephone; and a location system that determines a location of the telephone. The telephone may analyze data from the sensors using at least one of rules, image processing, and natural language processing to automatically reduce the audio volume of the telephone speaker.

Implementations of the invention provide a system and method to automatically understood the surroundings of a telephonic conversation and warn and user or automatically adjust a loudness level of the conversation. In embodiments, the automatic check of the surrounding area checks for location information such as whether this is a quiet place (e.g., library, school, business). In embodiments, the automatic check of the surrounding area checks for body language of others to determine whether others are being bothered. In embodiments, the automatic check of the surrounding area checks the level of surrounding ambient sound in order to determine if the conversational volume of the call is appropriate.

In an aspect of the invention, the volume of a telephone loudspeaker (e.g., speaker) is automatically controlled based on the conversation subject matter and whether it is determined to be sensitive or confidential. In embodiments, Natural Language Processing (NLP) is used to determine when the subject matter being discussed in a telephone call is sensitive or confidential, in which case the telephone being used in the conversation automatically reduces its speaker volume.

In another aspect of the invention, the volume of a telephone speaker is automatically controlled based on a determined distance of the telephone to another person. In embodiments, when a telephone is being used in a conversation, data collected by a camera associated with the telephone may be used to determine when another person is within a predefined distance relative to the telephone, in which case the telephone automatically reduces its speaker volume. For example, image processing may be used to determine when a person is within the field of view of the camera associated with the telephone. Image processing may also be used to determine a distance from the camera to an object (e.g., the person) within the field of view of the camera. In this manner, a camera and image processing programs may be used to determine when another person is within a certain distance of the telephone, and the speaker volume of the telephone may be automatically adjusted based on this determination.

In another aspect of the invention, the volume of a telephone speaker is automatically controlled based on a determined level of annoyance of another person in the vicinity of the telephone. In embodiments, when a telephone is being used in a conversation, data collected by a camera associated with the telephone may be used to determine when a person within the vicinity of the telephone has reached a level of annoyance, in which case the telephone automatically reduces its speaker volume. The level of annoyance may be determined from body language such as facial expressions. For example, facial recognition programming may be used with the camera data to determine when a person within the field of view of the camera has reached a level of annoyance, e.g., by determining that their detected mood has changed from a first mood (e.g., happy, indifferent, etc.) to a second mood (e.g., anger, contempt, etc.).

In another aspect of the invention, the volume of a telephone speaker is automatically controlled based on a determined location of the telephone. The location of the telephone being used in a conversation may be determined using a location system such as a Global Positioning System (GPS). In embodiments, the determined location of the telephone is compared to pre-defined quiet areas, such as libraries, office areas, etc. In the event the location of the telephone is determined to be within a pre-defined quiet area, the telephone being used in the conversation automatically reduces its speaker volume.

In another aspect of the invention, the volume of a telephone speaker is automatically controlled based on a determined loudness relative to ambient sound levels. In embodiments, at least one microphone detects a loudness of the speaker of the telephone being used in a conversation and an ambient loudness of the surroundings. When the loudness of the telephone speaker exceeds the ambient loudness by a predefined amount (e.g., percentage or raw decibels), the telephone being used in the conversation automatically reduces its speaker volume.

Systems in accordance with aspects of the invention may be adapted to permit a user to configure features described herein. In embodiments, the system permits a user to selectively activate and deactivate automatic volume reduction for each of factors independent of the other factors. For example, a user may configure their telephone to activate automatic volume reduction as described herein for detected sensitive/confidential material and detected level of annoyance, but not to activate automatic volume for determined distance, determined location of the telephone, and determined loudness relative to ambient sound levels.

Another configurable feature may involve the telephone providing an alert to the user. For example, the user may be permitted to select one of the following modes of operation: the telephone provides an alert to the user without automatically reducing volume; the telephone provides an alert to the user and then automatically reduces volume a number of seconds after the alert; the telephone automatically reduces volume without providing an alert to the user.

Another configurable feature may involve the speed at which the telephone automatically reduces the volume. For example, the user may be permitted to select a period of time over which the volume reduction takes place, e.g., from zero seconds (an instantaneous reduction) to a non-zero number of seconds (a slower, fading reduction).

Aspects of the invention may be implemented with either: a landline telephone that is connected by a pair of wires to a telephone network; or a mobile phone, such as a cellular phone, that is portable and communicates with the telephone network by radio transmissions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

Figure 1:
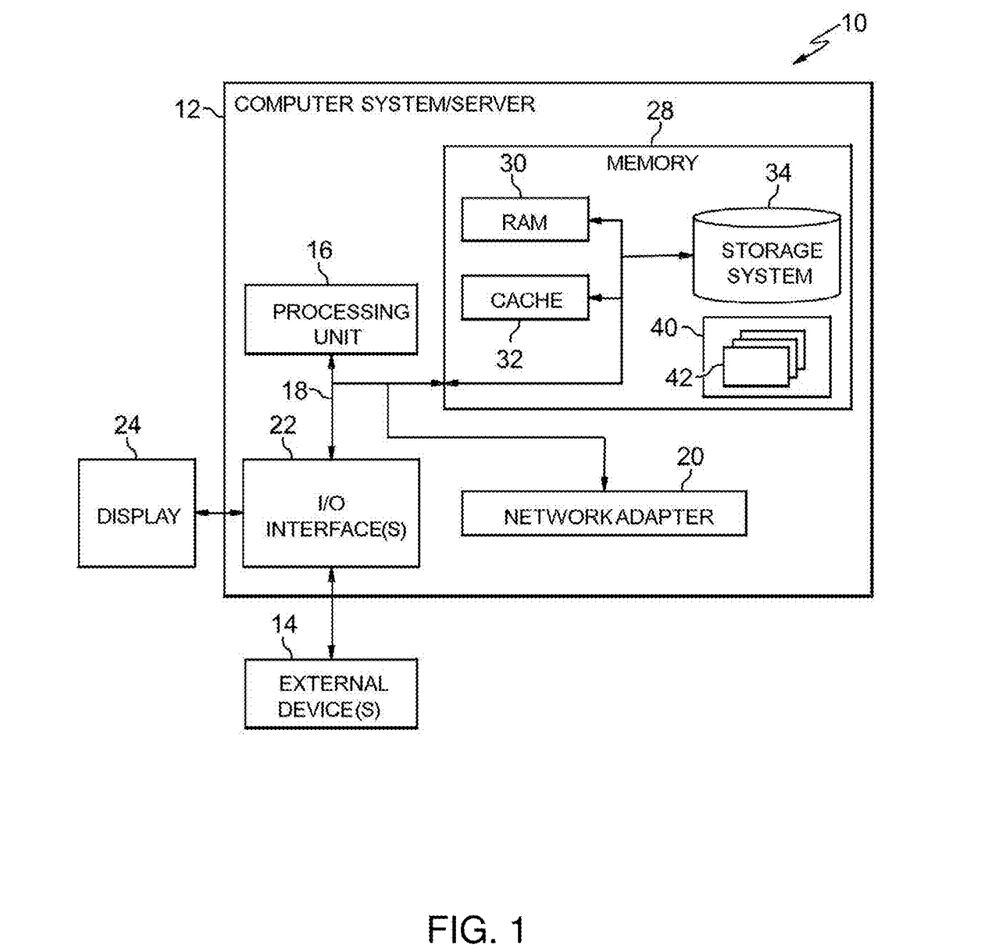
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
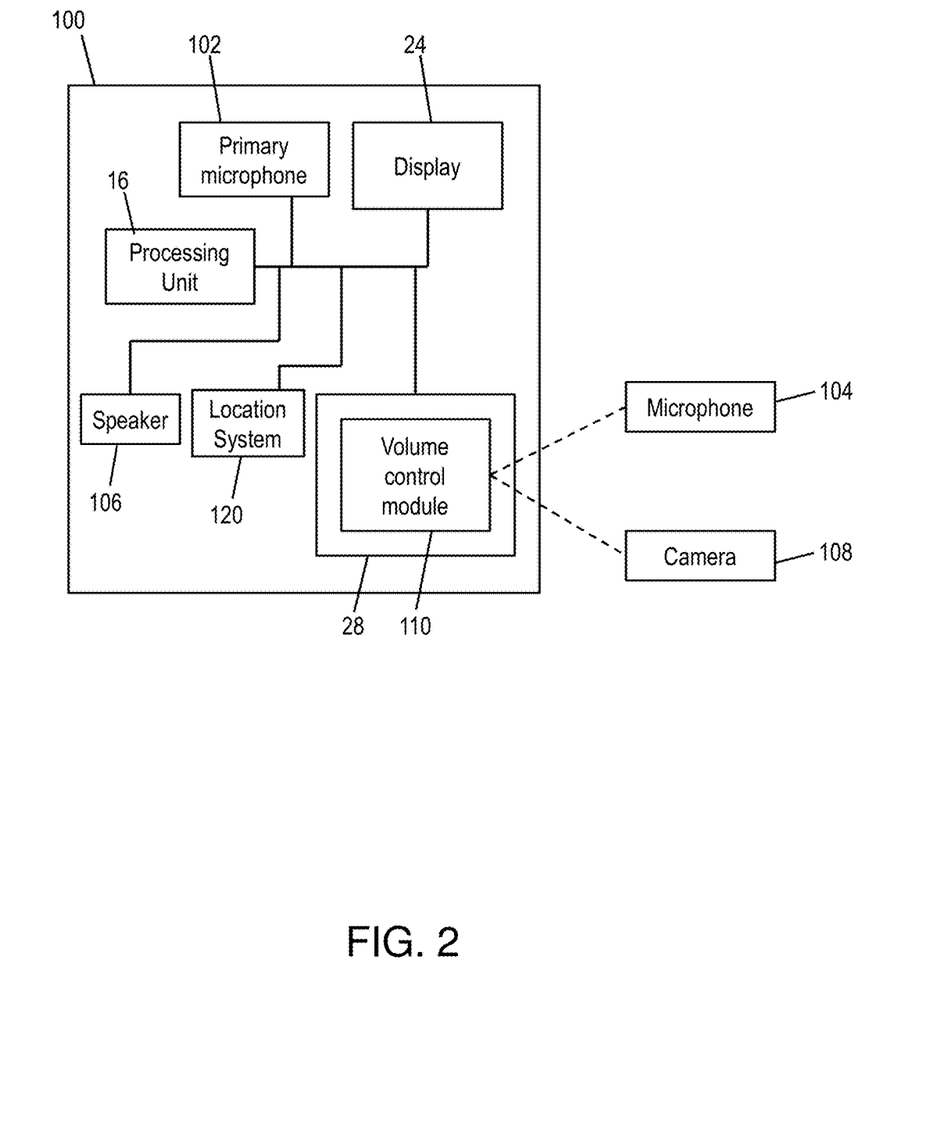
FIG. 2 shows an exemplary environment in accordance with aspects of the invention.

FIG. 2 shows a block diagram of an exemplary system in accordance with aspects of the invention. In embodiments, the system includes a telephone device (e.g. telephone) 100, a primary microphone 102, an additional microphone 104, a speaker 106, and a camera 108. The telephone 100 may be a computing device and may be implemented using the computer system 12 of FIG. 1 or another suitable computing device. For example, the telephone 100 may comprise a processing unit 16, a memory 28, and a display 24. The memory 28 may store applications and/or program modules including a volume control module 110 that is executed by the processing unit 16 to perform one or more of the processes described herein.

The additional microphone 104 and camera 108 may be integrated with the telephone, or may be separate from the telephone 100 and transmit electrical signals to the telephone 100 via wired or wireless communication. There may be any desired number of additional microphones 104, including one or more than one (i.e., plural). There may be any desired number of cameras 108, including one or more than one (i.e., plural). In embodiments, the additional microphone 104 and the camera 108 are micro devices. For example, the additional microphone 104 may be a micro audio device.

The primary microphone 102 and the speaker 106 may be configured to receive and output audio (e.g., acoustic signals) of a telephone conversation in a conventional manner. For example, the primary microphone 102 may comprise an acoustic-to-electric transducer or sensor that converts sound into an electrical signal, and the speaker 106 may comprise a transducer that turns an electrical signal into sound waves. In this manner, the telephone 100 may be used to conduct a telephone conversation by receiving acoustic signals at the primary microphone 102, converting the acoustic signals to electrical signals, transmitting the electrical signals to another telephone (e.g., via a telephone network), receiving other electrical signals from the other telephone, converting and outputting the other electrical signals as other acoustic signals at the speaker 106. A level of electrical power driving the speaker 106 may be selectively adjusted to increase or decrease the volume of the speaker 106.

According to aspects of the invention, when the telephone 100 is being used to conduct a telephone conversation, the volume control module 110 is configured to receive data from the additional microphone 104 and the camera 108 and automatically adjust the volume of the speaker 106 based on this data. The volume control module 110 may comprise a program module 42 as described with respect to FIG. 1. The volume control module 110 may be programmed to provide functionality including: image processing to detect a person in a camera image; image processing to determine a distance to an object in a camera image; image processing to determine a mood of a person based on body language of the person in a camera image; and natural language processing (NLP) to detect sensitive and/or confidential subject matter in a conversation. Based on data received from the additional microphone 104 and the camera 108, and by using the programmed functionality, the volume control module 110 may determine situations where the volume of the speaker 106 of the telephone 100 is automatically reduced.

In an aspect of the invention, when the telephone 100 is being used to conduct a telephone conversation, the volume control module 110 receives an electrical signal from the additional microphone 104 and analyzes the signal using NLP to determine when the subject matter being discussed in a telephone call is sensitive or confidential. NLP is a technique for breaking sentences down into something understood by a system. Deep parsing breaks a sentence down into noun phrases and verb phrases and then figures the prepositional phrase. The sentence is further broken down by part. NLP is used for enabling computers to derive meaning from natural language input stemming from any number of sources. An exemplary technique is a classification technique in which a machine reads and breaks down sentences to classify them or understand their meaning and even sentiment.

Lemmatization is another technique that can be applied. Lemmatization is the process of grouping together different inflected forms of a word in order that it can be analyzed as a single item. For example, "walking", "walks", "walked" all have a lemma of "walk". This will allow a better chance of accuracy in subject classification.

Ontology driven techniques (a model for describing the world that consists of a set of types properties and relationship types) could also be used for deep parse understanding. A triple is the functional decomposition of any sentence. The triple is composed of a subject, predicate, and object. The predicate is the main verb of the sentence, and the object is the direct object of that verb (the action recipient). The subject is verb agent, i.e., the one who carries out the action. By decomposing language into triples, one can better understand how entities relate to each other and navigate through unstructured text (via a triple store).

In embodiments, when the volume control module 110 determines (using NLP) that the subject matter being discussed in a telephone call is sensitive or confidential, the volume control module 110 causes the telephone 100 to reduce the volume of the speaker 106. For example, the volume control module 110 may provide a signal to the processing unit 16, which signal causes the processing unit to adjust (e.g., reduce) the electrical power provided to the speaker 106 for the purpose of lowering the volume of the speaker 106.

In an aspect of the invention, when the telephone 100 is being used to conduct a telephone conversation, the volume control module 110 receives an image from the camera 108 and analyzes the image to determine whether to automatically reduce the volume of the speaker 106. In embodiments, images collected by the camera 108 may be used to determine when another person is within a predefined distance relative to the telephone 100. For example, the volume control module 110 may use image processing to determine when a person is within the field of view of the camera 108, and to determine a distance from the telephone 100 to the person within the field of view of the camera 108. The telephone 100 may store data defining a threshold distance, and the volume control module 110 may compare the threshold distance to the determined distance to the person in the field of view of the camera 108. In embodiments, when the determined distance to the person in the field of view of the camera 108 is less than the threshold distance (e.g., indicating that the person is sufficiently close to the telephone 100), the volume control module 110 causes the telephone 100 to reduce the volume of the speaker 106.

In another aspect of the invention, when the telephone 100 is being used to conduct a telephone conversation, the volume control module 110 receives a series of images from the camera 108 and analyzes the images to determine whether to automatically reduce the volume of the speaker 106. In embodiments, images collected by the camera 108 may be used to determine a level of annoyance of another person in the vicinity of the telephone 100. The level of annoyance may be determined from body language such as facial expressions. For example, the volume control module 110 may use image processing techniques, in particular facial recognition programming, to determine when a person within the field of view of the camera 108 has reached a level of annoyance, e.g., by analyzing images from the camera 108 to determine that the person's detected mood has changed from a first mood (e.g., happy, indifferent, etc.) to a second mood (e.g., anger, contempt, etc.). In embodiments, when the volume control module 110 determines that a person's level of annoyance has changed in this manner, the volume control module 110 causes the telephone 100 to reduce the volume of the speaker 106.

In an aspect of the invention, when the telephone 100 is being used to conduct a telephone conversation, the volume control module 110 receives an electrical signal from the additional microphone 104 and analyzes a loudness of the speaker 106 relative to an ambient noise level. In embodiments, the additional microphone 104 detects a loudness of the speaker of the telephone 100 and separately detects an ambient loudness of the surroundings (e.g., other noise in the area around the telephone 100). In embodiments, the volume control module 110 compares the detected loudness of the speaker 106 to the detected ambient loudness. The telephone 100 may store data defining a threshold value, e.g., as a percentage or an absolute value. In embodiments, when the detected loudness of the speaker 106 exceeds the detected ambient loudness by more than the threshold value, the volume control module 110 causes the telephone 100 to reduce the volume of the speaker 106.

Still referring to FIG. 2, the telephone 100 may also include a location system 120 that determines a location of the telephone. For example, the location system 120 may be part of a GPS. In an aspect of the invention, when the telephone 100 is being used to conduct a telephone conversation, the volume control module 110 receives data from the location system 120 and analyzes the data to determine whether to automatically reduce the volume of the speaker 106. In embodiments, the telephone 100 stores or has access to a list of predefined quiets areas, which may correspond to, for example, libraries, office spaces, etc. The list of predefined quiet areas may include locations (e.g., coordinates) of each quiet area. The volume control module 110 may compare coordinates of the telephone 100 provided by the location system 120 to coordinates of the predefined quiets areas to determine whether the telephone 100 is located within a predefined quiet area. In embodiments, when the telephone is within a predefined quiet area, the volume control module 110 causes the telephone 100 to reduce the volume of the speaker 106.

The telephone 100 in accordance with aspects of the invention may be adapted to permit a user to configure aspects of the automatic volume control described herein. In embodiments, the volume control module 110 permits a user to selectively activate and deactivate automatic volume reduction for each of factors (e.g., sensitive/confidential material, distance to another person, level of annoyance of another person, loudness relative to ambient sound levels, and telephone location relative to quiet areas) independent of the other factors. For example, the volume control module 110 may cause the display 24 to display a user interface (UI) by which a user of the telephone 100 may provide input to configure the volume control module 110.

In additional embodiments, the volume control module 110 is adapted to permit the user to configure (e.g., via the UI) features such as: whether or not to provide an alert to the user when it is determined to reduce to the speaker volume; and the speed at which the telephone automatically reduces the volume. For example, the user may be permitted to select one of the following modes of operation: the telephone provides an alert to the user without automatically reducing volume; the telephone provides an alert to the user and then automatically reduces volume a number of seconds after the alert; the telephone automatically reduces volume without providing an alert to the user. In another example, the user may be permitted to select a period of time over which the volume reduction takes place, e.g., from zero seconds (an instantaneous reduction) to a non-zero number of seconds (a slower, fading reduction).

Figure 3A:
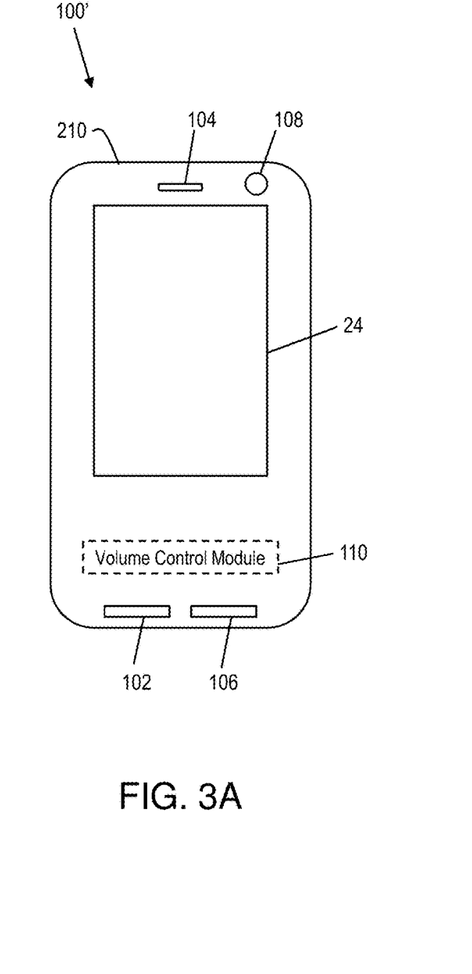
FIGS. 3A-3D show exemplary implementations in accordance with aspects of the invention.

FIGS. 3A, 3B, 3C, and 3D show exemplary embodiments in accordance with aspects of the invention. FIG. 3A shows a system in which the telephone 100' comprises a mobile phone 210, and in which the primary microphone 102, the additional microphone 104, the speaker 106, and the camera 108 are integrated with the mobile phone 210. The mobile phone 210 may be a smartphone comprising a processing unit, a memory, and a display 24. The memory may store mobile applications and/or program modules including the volume control module 110 that is executed by the processing unit. The display 24 may comprise a capacitive touch screen display that outputs an electronic visual display and that receives user input via stylus and/or finger touch. The mobile phone 210 may also include at least one antenna configured for wireless communication via at least one of cellular, WiFi, Bluetooth, and near field communication (NFC). The mobile phone 210 may also include a rechargeable battery and sensors such as an accelerometer, gyroscope, compass, and GPS.

Figure 3B:
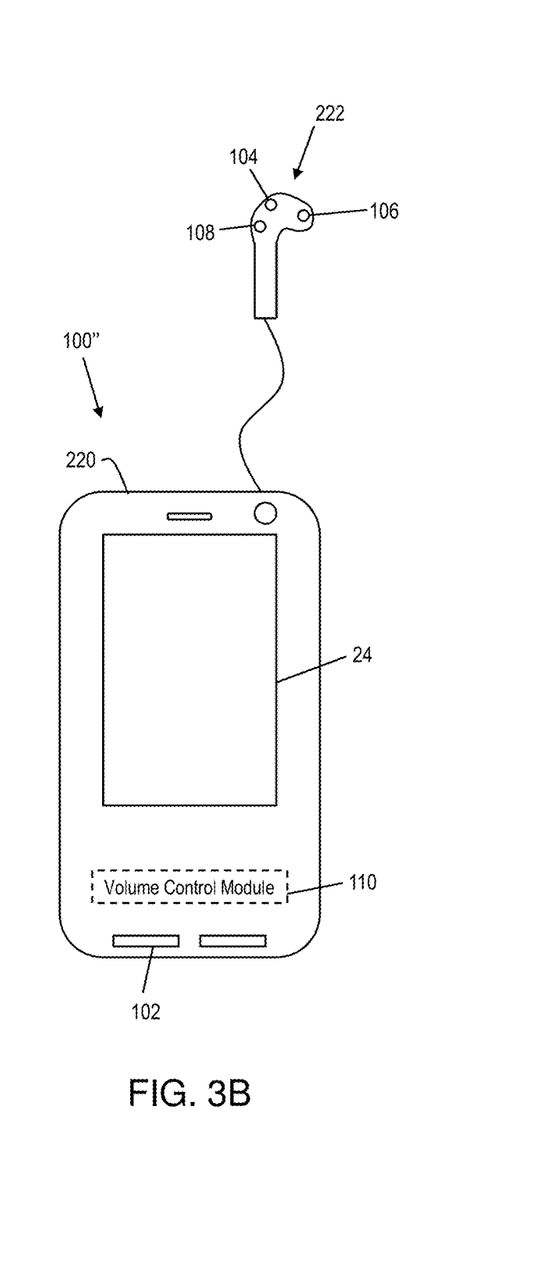

FIG. 3B shows a system in which the telephone 100″ comprises a mobile phone 220, and in which the additional microphone 104, the speaker 106, and the camera 108 are separate from the mobile phone 210. The mobile phone 220 may be a smartphone comprising a processing unit, a memory, and a display 24. The memory may store mobile applications and/or program modules including the volume control module 110 that is executed by the processing unit. The display 24 may comprise a capacitive touch screen display that outputs an electronic visual display and that receives user input via stylus and/or finger touch. The mobile phone 220 may also include at least one antenna configured for wireless communication via at least one of cellular, WiFi, Bluetooth, and near field communication (NFC). The mobile phone 220 may also include a rechargeable battery and sensors such as an accelerometer, gyroscope, compass, and GPS. In the embodiment shown in FIG. 3B, the additional microphone 104, the speaker 106, and the camera 108 are integrated in a headset or earphones 222 worn by the person using the mobile phone 220. The headset or earphones 222 may communicate with the mobile phone 220 by wired or wireless communication.

Figure 3C:
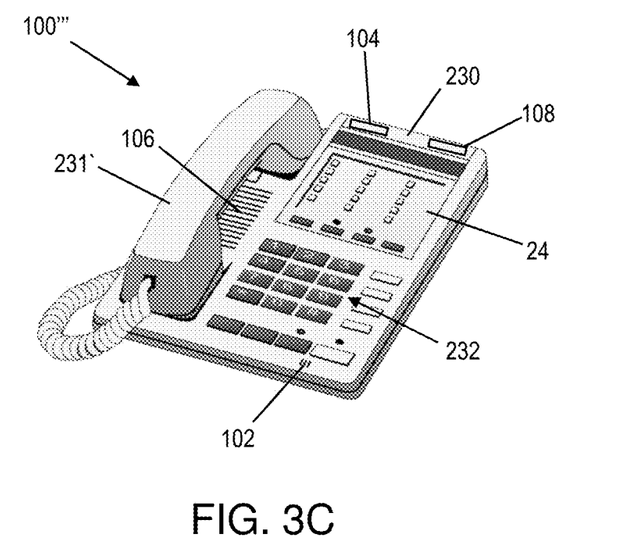

FIG. 3C shows a system in which the telephone 100‴ comprises a landline telephone 230, and in which the primary microphone 102, the additional microphone 104, the speaker 106, and the camera 108 are integrated with the landline telephone 230. The landline telephone 230 may comprise a handset 231, a display 24, and buttons 232. Additionally, the landline telephone 230 may comprise the processing unit and memory that stores the volume control module 110.

Figure 3D:
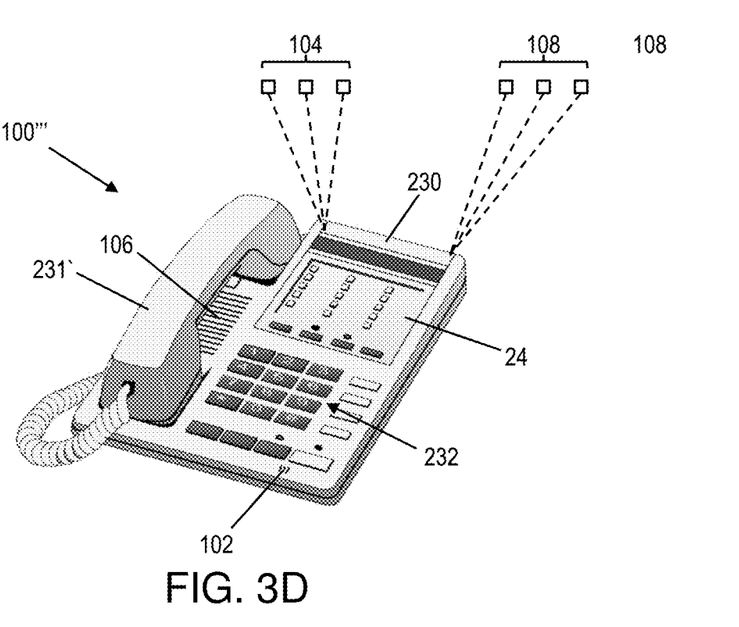

FIG. 3D shows a system in which the telephone 100″″ comprises a landline telephone 240, and in which the additional microphone 104 and the camera 108 are separate from the landline telephone 240. The landline telephone 240 may comprise a handset 231, a display 24, and buttons 232. Additionally, the landline telephone 240 may comprise the processing unit and memory that stores the volume control module 110. The additional microphone 104 may comprise plural additional microphones 104 arranged at locations around the landline telephone 240, e.g., at locations in an office space. The camera 108 may comprise plural cameras 108 arranged at locations around the landline telephone 240, e.g., at locations in an office space.

Figure 4:
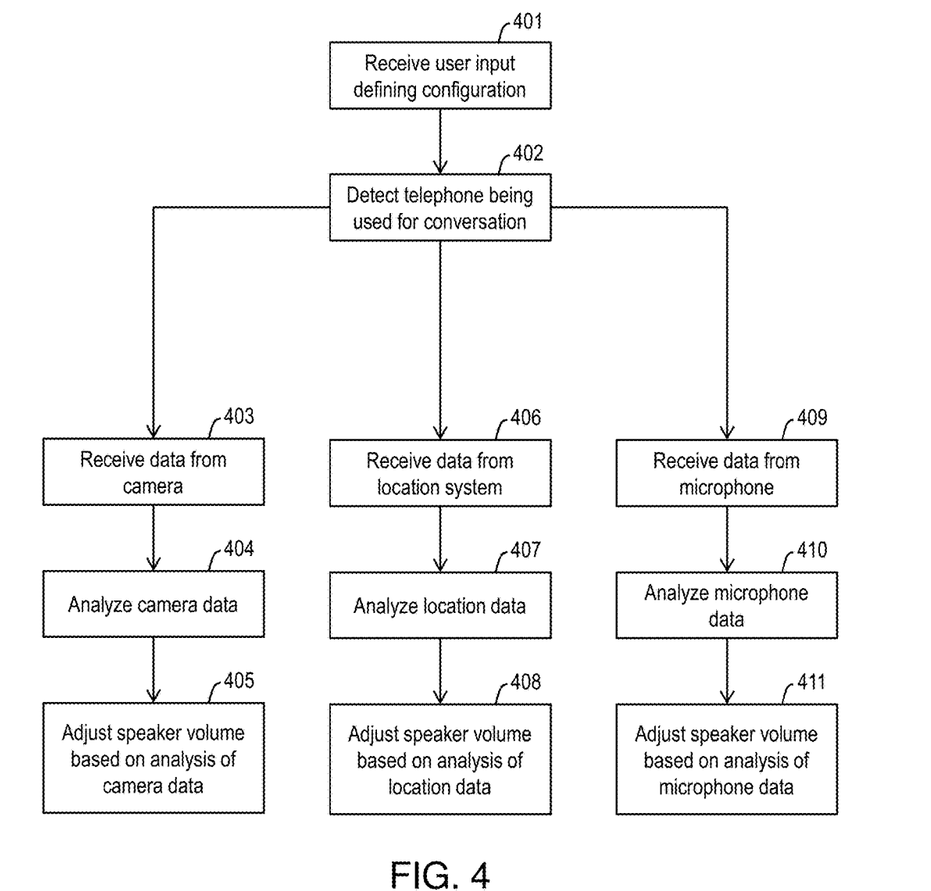
FIG. 4 shows a flowchart of a method in accordance with aspects of the invention.

FIG. 4 shows a flowchart of a method in accordance with aspects of the invention. Steps of the method of FIG. 4 may be performed in the environment illustrated in FIGS. 2 and 3A-D, and are described with reference to elements shown in FIGS. 2 and 3A-D.

FIG. 4 depicts a method of automatically adjusting speaker volume of a telephone. At step 401, a telephone (e.g., telephone 100) receives user input defining configuration of automatic volume control functionality for the telephone. In embodiments, the telephone displays a user interface (UI) to a user, and receives input from the user via the UI, wherein the input defines configurable parameters associated with a volume control module (e.g., volume control module 110) of the telephone.

At step 402, the telephone detects that a telephone conversation is occurring. The telephone may use conventional processes to detect when it is being employed to conduct a telephone conversation.

At step 403, the telephone receives data from a camera. In embodiments, the telephone receives at least one image from a camera (e.g., camera 108). As described with respect to FIGS. 2 and 3A-3D, the camera may be integrated with the telephone or separate from the telephone.

At step 404, the telephone analyzes the data from the camera (from step 403). In embodiments, the volume control module of the telephone uses at least one camera image to determine whether another person is within a predefined distance relative to the telephone, e.g., in the manner described with respect to FIG. 2. In additional embodiments, the volume control module uses camera images to determine an annoyance level of another person, e.g., in the manner described with respect to FIG. 2.

At step 405, based on the analysis at step 404, the telephone automatically adjusts the volume of a speaker (e.g., speaker 106) of the telephone. Step 405 may be performed in a manner similar to that described with respect to FIG. 2. In the event the user provided configuration input (e.g., at step 401), then the adjusting the volume of the speaker at step 405 may be performed in accordance with the user-defined configuration. For example, the phone may be configured to provide an alert to the user (e.g., a display and/or vibration) prior to automatically adjusting the volume of the speaker.

At step 406, the telephone receives location data from a location system. In embodiments, the telephone includes a GPS sensor that provides location data to the volume control module. The location data may define a GPS location of the telephone.

At step 407, the telephone analyzes the location data from step 406. In embodiments, the volume control module of the telephone compares the location data to predefined quiet areas, e.g., in the manner described with respect to FIG. 2. Step 406 may include the telephone accessing the list of quiet places in memory of the telephone, accessing another computing device to obtain the list of quiet areas, or submitting the location data of the telephone to a service provider that returns an indication of whether the telephone location coincides with a predefined quiet area.

At step 408, based on the analysis at step 407, the telephone automatically adjusts the volume of the speaker of the telephone. Step 408 may be performed in a manner similar to step 405.

At step 409, the telephone receives audio signal data from a microphone (e.g., additional microphone 104). As described with respect to FIGS. 2 and 3A-3D, the microphone may be integrated with the telephone or separate from the telephone.

At step 410, the telephone analyzes the data from the microphone (from step 409). In embodiments, the volume control module uses the data from the microphone to compare the loudness of the speaker to the ambient loudness, e.g., in the manner described with respect to FIG. 2. In additional embodiments, the volume control module uses the data from the microphone determine whether the telephone conversation includes sensitive or confidential words, e.g., using NLP in the manner described with respect to FIG. 2.

At step 411, based on the analysis at step 410, the telephone automatically adjusts the volume of the speaker of the telephone. Step 408 may be performed in a manner similar to step 405.

Each of steps 405, 408, and 411 may include an additional step of comparing a current volume level of the speaker to a minimum volume level. In the even the volume of the speaker is already at a minimum level, the volume control module may be programmed not automatically further reduce the volume of the speaker, since doing so might make the conversation imperceptible to the user.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for performing one or more of the processes described herein. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for automatically adjusting telephonic conversation volume, the computer program product comprising a computer readable storage medium having program instructions embodied therewith, the program instructions executable by a computing device to cause the computing device to:
   detect a telephone is being used for a telephone conversation;
   obtain microphone data from at least one microphone in communication with or incorporated in the telephone;
   detect, using the microphone data, sensitive or confidential subject matter in the conversation using natural language processing of the microphone data;
   receive, via a user interface of the computing device, a user selection to configure an alert notifying the user when it is determined to reduce the volume of a speaker of the telephone;
   automatically reduce the volume of the speaker of the telephone based on the detecting the sensitive or confidential subject matter;
   permit the user to selectively configure a speed at which the telephone automatically adjusts the volume;
   determine, using the microphone data, a conversation loudness exceeds ambient loudness by a predefined amount; and
   automatically adjust the volume of the speaker of the telephone based on the determining the conversation loudness exceeds the ambient loudness by the predefined amount.

2. The computer program product of claim 1, wherein the program instructions cause the computing device to automatically adjust the volume of the speaker by causing a processing unit of the telephone to reduce electrical power provided to the speaker to lower the volume of the speaker.

3. The computer program product of claim 1, wherein the program instructions cause the computing device to obtain the microphone data from a primary microphone of the telephone and a secondary microphone that is separate from the telephone.

4. The computer program product of claim 1, wherein the detecting the sensitive or confidential subject matter in the conversation using natural language processing comprises utilizing a volume control module to break down sentences of the conversation to derive a meaning of the sentences using the natural language processing.

5. The computer program product of claim 1, wherein the program instructions further cause the computing device to display the user interface on the telephone;
   wherein the telephone comprises a memory, a display, and a processing unit running a volume control module;
   wherein the at least one microphone comprises a primary microphone integrated with the telephone and an additional microphone integrated with the telephone;
   wherein the obtaining microphone data comprises receiving microphone data from the additional microphone; and
   wherein the automatically reducing the volume of the speaker comprises the volume control module causing the processing unit to reduce electrical power provided to the speaker to lower the volume of the speaker.

6. A computer program product for automatically adjusting telephonic conversation volume, the computer program product comprising a computer readable storage medium having program instructions embodied therewith, the program instructions executable by a computing device to cause the computing device to:
   detect a telephone is being used for a telephone conversation;
   obtain microphone data from at least one microphone in communication with or incorporated in the telephone;
   detect, using the microphone data, sensitive or confidential subject matter in the conversation using natural language processing of the microphone data;
   receive, via a user interface of the computing device, a user selection to configure an alert notifying the user when it is determined to reduce the volume of a speaker of the telephone;
   automatically reduce the volume of the speaker of the telephone based on the detecting the sensitive or confidential subject matter;
   permit the user to selectively configure a speed at which the telephone automatically adjusts the volume; and
   cause the computing device to permit a user to selectively activate and deactivate automatic volume reduction for each one of plural factors independent of other ones of the plural factors.

7. The computer program product of claim 6, wherein the plural factors include:

sensitive or confidential words being used in the conversation;

another person being within a predefined distance of the telephone; and a location of the telephone coinciding with a predefined quiet area.

8. The computer program product of claim 6, wherein the plural factors include:

a conversation loudness exceeding an ambient loudness by a predefined amount.

9. The computer program product of claim 6, wherein the program instructions cause the computing device to automatically adjust the volume of the speaker by causing a processing unit of the telephone to reduce electrical power provided to the speaker to lower the volume of the speaker.

10. The computer program product of claim 6, wherein the program instructions cause the computing device to obtain the microphone data from a primary microphone of the telephone and a secondary microphone that is separate from the telephone.

11. The computer program product of claim 6, wherein the program instructions cause the computing device to issue an alert when the volume is automatically adjusted.

12. A computer program product for automatically adjusting telephonic conversation volume, the computer program product comprising a computer readable storage medium having program instructions embodied therewith, the program instructions executable by a computing device to cause the computing device to:

detect a telephone is being used for a telephone conversation;

obtain microphone data from at least one microphone in communication with or incorporated in the telephone;

detect, using the microphone data, sensitive or confidential subject matter in the conversation using natural language processing of the microphone data;

receive, via a user interface of the computing device, a user selection to configure an alert notifying the user when it is determined to reduce the volume of a speaker of the telephone;

automatically reduce the volume of the speaker of the telephone based on the detecting the sensitive or confidential subject matter;

permit the user to selectively configure a speed at which the telephone automatically adjusts the volume; and cause the computing device to issue an alert when the volume is automatically adjusted.

13. The computer program product of claim 12, wherein the detecting the sensitive or confidential subject matter in the conversation using natural language processing comprises utilizing a volume control module to break down sentences of the conversation to derive a meaning of the sentences using the natural language processing.

14. The computer program product of claim 12, wherein the program instructions further cause the computing device to display the user interface on the telephone;

wherein the telephone comprises a memory, a display, and a processing unit running a volume control module;

wherein the at least one microphone comprises a primary microphone integrated with the telephone and an additional microphone integrated with the telephone;

wherein the obtaining microphone data comprises receiving microphone data from the additional microphone; and wherein the automatically reducing the volume of the speaker comprises the volume control module causing the processing unit to reduce electrical power provided to the speaker to lower the volume of the speaker.

* * * * *